United States Patent
Marlon et al.

(10) Patent No.: US 8,543,969 B2
(45) Date of Patent: Sep. 24, 2013

(54) METHOD AND APPARATUS FOR DEVELOPING A COMPUTER PROGRAM UTILIZING A SERVICE ORIENTED ARCHITECTURE

(75) Inventors: Eyal Marlon, Ramat-Gan (IL); Elizabeth Gutt, Raanana (IL)

(73) Assignee: SAP Portals Israel Ltd., Raánana (IL)

( * ) Notice: Subject to any disclaimer, the term of this patent is extended or adjusted under 35 U.S.C. 154(b) by 1111 days.

(21) Appl. No.: 12/264,925

(22) Filed: Nov. 5, 2008

(65) Prior Publication Data

US 2010/0115491 A1   May 6, 2010

(51) Int. Cl.
*G06F 9/44* (2006.01)
(52) U.S. Cl.
USPC .......................... 717/104; 717/107; 717/120
(58) Field of Classification Search
USPC .................. 717/104–109, 120–122
See application file for complete search history.

(56) References Cited

U.S. PATENT DOCUMENTS

| | | | | |
|---|---|---|---|---|
| 6,167,563 A * | 12/2000 | Fontana et al. | ............. | 717/107 |
| 6,269,473 B1 * | 7/2001 | Freed et al. | ............. | 717/104 |
| 6,981,242 B2 * | 12/2005 | Lehmeier et al. | ............. | 717/122 |
| 6,988,536 B2 * | 1/2006 | Lee et al. | ............. | 165/104.33 |
| 7,143,392 B2 * | 11/2006 | Ii et al. | ............. | 717/125 |
| 7,246,344 B1 * | 7/2007 | Christensen et al. | ......... | 717/109 |
| 7,318,216 B2 * | 1/2008 | Diab | ............. | 717/108 |
| 7,493,602 B2 * | 2/2009 | Jaeger et al. | ............. | 717/137 |
| 7,631,299 B2 * | 12/2009 | Kannenberg | ............. | 717/121 |
| 7,716,634 B2 * | 5/2010 | Ross et al. | ............. | 717/106 |
| 7,797,400 B2 * | 9/2010 | Singh et al. | ............. | 709/219 |
| 7,895,572 B2 * | 2/2011 | Stienhans | ............. | 717/120 |
| 7,966,603 B2 * | 6/2011 | Brunswig et al. | ............. | 717/120 |
| 8,006,224 B2 * | 8/2011 | Bateman et al. | ............. | 717/104 |
| 8,019,632 B2 * | 9/2011 | Niheu et al. | ............. | 705/7.11 |
| 8,086,995 B2 * | 12/2011 | Luo et al. | ............. | 717/105 |
| 8,296,721 B2 * | 10/2012 | Sivaram | ............. | 717/104 |
| 8,321,834 B2 * | 11/2012 | Baker et al. | ............. | 717/107 |

OTHER PUBLICATIONS

Rellermeye et al, "Co-Managing Software and Hardware Modules through the Juggle Middleware", ACM, pp. 420-439, 2011.*
Sygal et al, "TowardsModular Development of Typed Unification Grammars" ACM, vol. 37, No. 1, pp. 29-74, 2011.*
Shankaran et al, "Design and Performance Evaluation of an Adaptive Resource Management Framework for Distributed Real-Time and Embedded Systems", Hindawi Publishing Corporation, EURASIP Journal on Embedded Systems, Article ID 250895, pp. 1-20, 2008.*
Li et al. "Using Random Test Selection to Gain Confidence in Modified Software", IEEE, pp. 267-276, 2008.*

* cited by examiner

*Primary Examiner* — Anil Khatri
(74) *Attorney, Agent, or Firm* — Soroker-Agman

(57) ABSTRACT

A method and apparatus for developing a computer program utilizing services that may not be available during development. A dummy service providing a naïve implementation of the service that is to be provided by the services is obtained or created. The computer program is modified such that it utilizes the dummy service. After an actual service is available, the computer program is modified once more to utilize the actual service instead of the dummy service.

13 Claims, 9 Drawing Sheets

METHOD AND APPARATUS FOR DEVELOPING A COMPUTER PROGRAM UTILIZING A SERVICE ORIENTED ARCHITECTURE

BACKGROUND OF THE INVENTION

1. Field of the Invention

The present disclosure relates to computer program development in general, and to development of a computer program using service oriented architecture, in particular.

2. Description of Related Art

In Service Oriented Architecture (SOA), a computer program comprises at least a software module and a service layer comprising a set of services employed by the software module. In many scenarios the software module is a user interface (UI). When developing the software module the service layer needs to be available in order to examine the quality of the software module. When the service layer is not available to the developer of the software module, the development process may be held back or even brought to a complete stop.

In some cases, the service layer is not available as some of the services are not yet developed. Since the development of complex services is a time consuming task, some services may be unavailable for a long period of time.

In SOA based systems, some services are reused by several different software modules. Some services may even be reused by different developers of varied companies. For that purpose, those services need to be generic and may contain many fields to fit the needs of the variety of entities that may use the services. Each entity that uses the generic service would usually use only a small fraction of the fields, logic and capabilities of the generic service. Hence, using a generic service requires good familiarity with its various fields. Normally, a developer is not familiar with many generic services and mapping a set of fields of a generic service that the service module should use is a time consuming task for him. A developer familiar with the generic service, such as a service developer, may perform such a task more efficiently.

In other cases, it may be desirable to produce a working prototype showing basic features of the computer program in a short time period. The prototype may later be used to better define a service that will be needed by a finalized software module.

In some scenarios, examining the quality of a software module requires operating a service many times. When a service is complex, it may require a non-negligible computation time each time it is operated. Also, additional resources such as hardware resources may be required for operating a complex service. In such scenarios, the Quality Assurance (QA) process is less cost effective, as a time resource is being wasted and the additional resources are required.

In view of the foregoing, the development process of the service module is usually postponed until the services are fully developed and until a service developer maps the fields to be used by the software module. The development of the software module is completed only after the service layer is completed.

There is therefore a need for an apparatus and method to enable a development of a computer program by parallel development of the software module and the service layer.

BRIEF SUMMARY OF THE INVENTION

An aspect of an embodiment of the disclosed subject matter relates to a computerized apparatus and method within a computerized environment for development of a computer program using service oriented architecture.

A first aspect of the subject matter is a computerized apparatus for developing a computer program, the computer program comprising a software module that is designed to use at least one service and the computerized apparatus comprising an adaptation module for adapting the software module to use at least one dummy service.

In some exemplary embodiments of the disclosed subject matter, the computerized apparatus further comprises a service replacement module for replacing the at least one dummy service used by the software module with at least one second service.

In some exemplary embodiments of the disclosed subject matter, the service replacement module maps at least one input field of the at least one dummy service with at least one input field of the at least one second service.

In some exemplary embodiments of the disclosed subject matter, the service replacement module replaces the at least one dummy service with at least one second service from a set of predetermined services.

In some exemplary embodiments of the disclosed subject matter, the at least one second service is either an at least one additional dummy service or an at least one actual service or a combination thereof.

In some exemplary embodiments of the disclosed subject matter, the computerized apparatus further comprises a dummy service obtainer for obtaining the at least one dummy service.

In some exemplary embodiments of the disclosed subject matter the dummy service obtainer creates the at least one dummy service based on an interface.

In some exemplary embodiments of the disclosed subject matter, the computerized apparatus further comprises a software module obtainer for obtaining a software module based on a portion of the at least one dummy service.

In some exemplary embodiments of the disclosed subject matter, the software module is a user interface.

A second aspect of the subject matter is a method for enabling development of a computer program within a computerized environment, the computer program compromising at least a software module that is designed to use at least one service, the method comprising enabling a developer to obtain at least one dummy service enabling a developer to obtain the software module, providing an adaptation module for associating a portion of the at least one service used by the software module with at least one service provided by at least one dummy service, adapting the software module to use at least one dummy service, whereby after utilizing the adaptation module, the developer is able to develop the software module and provide a development version of the computer program, the development version of the computer program comprises the at least one software module that utilizes the at least one service provided by of the at least one dummy service.

In some exemplary embodiments of the disclosed subject matter, the method further comprising a step of providing a replacement module for replacing the at least one dummy service with at least one second service, whereby utilizing the replacement module modifies the software module such that the at least one second service provides at least one service for the software module upon service request from the software module.

In some exemplary embodiments of the disclosed subject matter, the replacement module is able to assist the developer in mapping at least one input field of the at least one dummy service with at least one input field of the at least one second service.

In some exemplary embodiments of the disclosed subject matter, the step of enabling a developer to obtain at least one dummy service comprises a step of providing a dummy service obtainer for obtaining the at least one dummy service.

In some exemplary embodiments of the disclosed subject matter, the dummy service obtainer creates the at least one dummy service.

In some exemplary embodiments of the disclosed subject matter, the software module is a user interface.

A third aspect of the subject matter is a method for developing a computer program within a computerized environment, the program comprising at least a software module that is designed to use at least one service, the method comprising obtaining the software module for developing of the computer program, obtaining an at least one dummy service, associating a portion of the at least one service used by the software module with at least one service provided by the at least one dummy service, wherein the step of associating the software module is performed by an adaptation module, whereby a developer is able to develop the software module and provide a development version of the computer program, the development version of the computer program comprises the at least one software module that utilizes the at least one service provided by of the at least one dummy service.

In some exemplary embodiments of the disclosed subject matter, the method further comprises a step of replacing the at least one dummy service by at least one second service; wherein the step of replacing the at least one dummy service is performed by a service replacement module; and whereby the at least one second service provides at least one service for the software module upon service request from the software module.

In some exemplary embodiments of the disclosed subject matter, the step of replacing the at least one dummy service is performed by mapping at least one input field of the at least one dummy service with at least one input field of the at least one second service.

In some exemplary embodiments of the disclosed subject matter, the method further comprises a step of obtaining the at least one second service from a predetermined set of services.

In some exemplary embodiments of the disclosed subject matter, the step of obtaining an at least one dummy service comprises creating the at least one dummy service based on an interface.

In some exemplary embodiments of the disclosed subject matter, the step of creating the at least one dummy service utilizes a template.

In some exemplary embodiments of the disclosed subject matter, the step of creating the at least one dummy service further comprises defining at least one input field, defining at least one output field, and defining logic to be performed on the at least one input field to determine a value for each of the at least one output field.

In some exemplary embodiments of the disclosed subject matter, the method further comprises a step of creating the software module based on a portion the at least one dummy service.

In some exemplary embodiments of the disclosed subject matter, the software module is a user interface.

It is a fourth object of the subject matter to disclose a computer program product embodied on one or more computer-usable medium for performing a computer process comprising a first computer-readable program code for adapting a software module to use at least one dummy service.

In some exemplary embodiments of the disclosed subject matter, the computer program product further comprises a second computer-readable program code for replacing the at least one dummy service by at least one second service.

In some exemplary embodiments of the disclosed subject matter, the computer program product further comprises a third computer-readable program code for obtaining the at least one dummy service.

In some exemplary embodiments of the disclosed subject matter, the third computer-readable program code is able to create the at least one dummy service.

In some exemplary embodiments of the disclosed subject matter, the third computer-readable program code is able to create the at least one dummy service based on a template.

In some exemplary embodiments of the disclosed subject matter, the computer program product further comprises a third computer-readable program code for obtaining the software module based on a portion of the at least one dummy service.

In some exemplary embodiments of the disclosed subject matter, the software module is a user interface.

BRIEF DESCRIPTION OF THE DRAWINGS

The present invention will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

A technical problem dealt with in the subject matter is to develop a software module and a service layer in parallel without having the software module development to be dependent on the availability of the service layer.

A one technical solution is to provide a dummy service, meeting specifications of an interface that the software module uses, and that later should be replaced by an actual service of the service layer. Another technical solution is to provide an adaptation module for adapting the software module with a dummy service. Yet another technical solution is to provide a dummy service and based on the dummy service to create a software module that utilizes the dummy service. An additional technical solution is to replace a dummy service used by the software module with a second service, be it a second dummy service or an actual service. In some exemplary embodiments of the disclosed subject matter replacement is performed by mapping fields of the dummy service with fields of the second service.

A one technical effect of the disclosed subject matter is a service module using a dummy service as a service for the development period or as a prototype. Another technical effect is adapting a service module that was developed using a dummy service to use instead an actual service.

In the below description the software module is exemplified by a user interface (UI). However, the disclosed subject matter is not limited to a software module of that type. In some exemplary embodiments of the disclosed subject matter, the software module may be a daemon application, a software engine or process engine, such as a search engine, a web application and the like. The software module is characterized in that it may consume services provided by a separate service.

Figure 1:
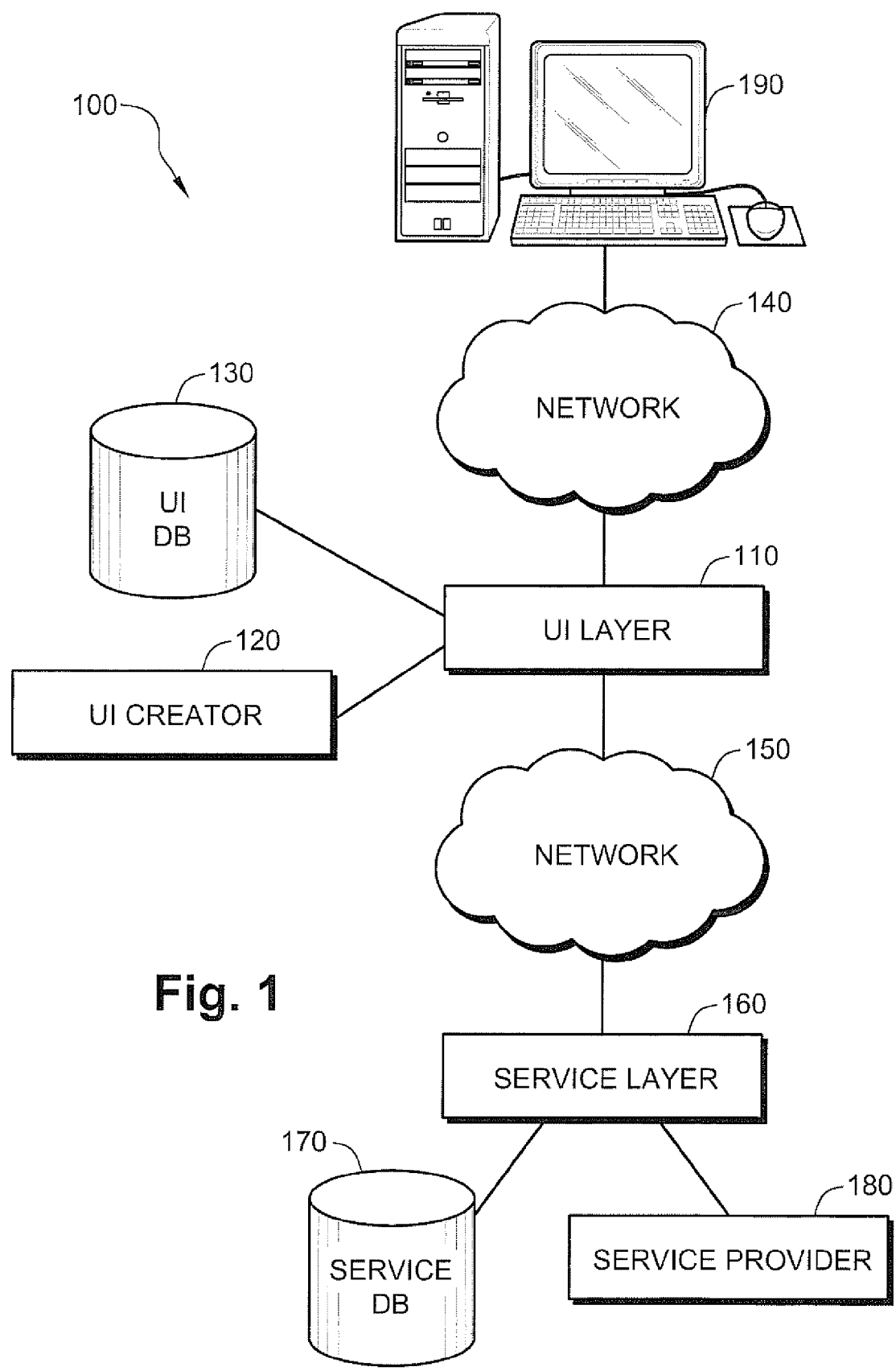
FIG. 1 shows a diagram of an environment 100 in which the disclosed method and apparatus can be implemented and used, in accordance with some exemplary embodiments of the disclosed subject matter.

FIG. 1 shows a diagram of an environment 100 in which the disclosed method and apparatus can be implemented and used, in accordance with some exemplary embodiments of the disclosed subject matter. The environment 100 comprises a first computerized network 150 connecting a UI layer 110 and a service layer 160. The environment 100 further comprises a second computerized network 140 connecting the UI layer 110 and a client 190. In some exemplary embodiments of the disclosed subject matter the first computerized network 150 and the second computerized network 140 are different computerized networks. In some exemplary embodiments, the first computerized network 150 and the second computerized network 140 are the same computerized network. In one exemplary embodiment, the first computerized network 150 may be an Intra-net, a private computerized network, and the second computerized network 140 may be the Internet. In a second exemplary embodiment, the first computerized network 150 and the second computerized network 140 may be the internet. The first computerized network 150 and the second computerized network 140 may establish communication between two computerized platforms via any wire or wireless communication channel, such as RF, a local area network, a wide area network, the Internet, Intra-net, telephone network and the like, employing commonly used protocols such as but not limited to TCP, IP, IPTV or derivatives thereof. The environment 100 is characterized in that the client 190 may access the UI layer 110 and that the UI layer 110 may access the service layer 160. It is further noted that in some exemplary embodiments of the disclosed subject matter the first computerized networks 150 may only provide a computerized connection between the service layer 160 and the UI layer 110, for example by being comprised in the same machine. Similarly, the second computerized network 140 may only provide a computerized connection between the UI layer 110 and the client 190.

A computer program (not shown) being run by the client 190 comprises at least a UI (not shown) from the UI layer 110 which utilizes at least one service (not shown) of the service layer 160. The service layer 160 may be running on a computer system different than a computer system running the UI layer 110. The service may be provided by a service provider 180 such as a development team that specifically developed the service or as part of a service Database (DB) 170 provided by a third party such as for example SAP™ AC from Walldorf, Germany. In some exemplary environments 100, the service provider 180 provides an intermediate service that simplifies a complex service of the service DB 170 for the UI. The UI uses the intermediate service which in turn employs the complex service. In other exemplary environments 100, the intermediate service simplifies a complex service provided by a service provider 180 or by a service DB 170. The UI may be provided by a UI creator 120 or be comprised in a UI Database 130.

The client 190, the UI layer 110, the UI database 103, the UI creator 120, the service layer 160, the service database 170 or the service provider 180 may be a computerized platform such as any general purpose processor, for example a personal computer, a personal digital assistant, a mobile phone, a mainframe computer, or any other type of computing platform that is provisioned with at least one I/O port (not shown) and a CPU (not shown) or a microprocessor device (not shown). The client 190, the UI layer 110, the UI database 103, the UI creator 120, the service layer 160, the service database 170 or the service provider 180 may be a computer program being ran by a computerized platform.

Figure 2:
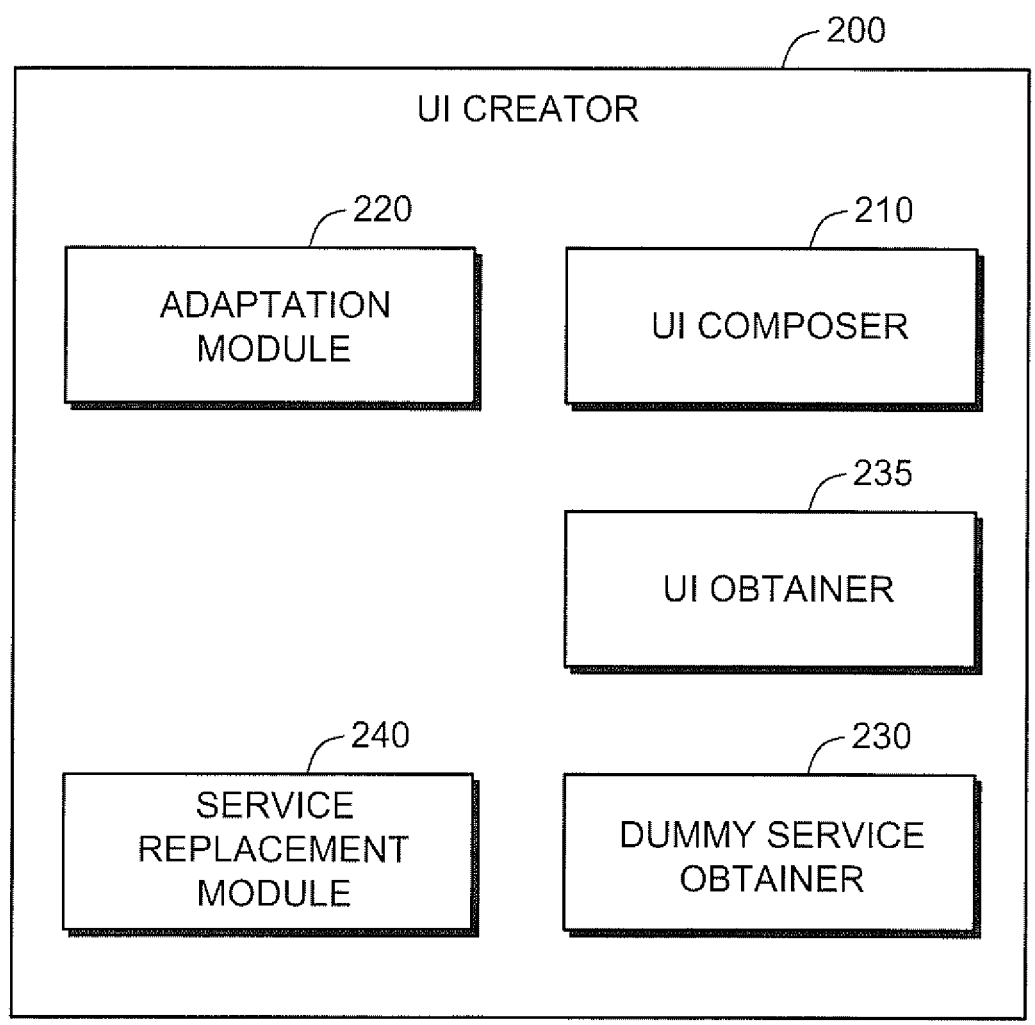
FIG. 2 shows a block diagram of an exemplary UI creator, in accordance with some exemplary embodiments of the disclosed subject matter.

FIG. 2 shows a block diagram of an exemplary UI creator, in accordance with some exemplary embodiments of the disclosed subject matter. A UI creator 200, such as a UI creator 120 of FIG. 1, may be a computerized apparatus for developing a UI using at least one service from a service layer. The UI provides an interface to operate a software, enabling a developer to select components, input data, view data, perform calculation on the data and the like. The UI creator 200 is preferably implemented as a computerized unit comprising one or more sets of interrelated computer instructions, arranged as an executable, service, script, module, or the like. The UI creator 200 comprises a UI composer 210 to allow a developer to develop a UI. The UI composer 210 may comprise a graphical user interface (GUI) for designing the UI. Using the GUI, the developer may select a predefined component for the UI, such as a form, a table, a push button, a radio button, a list, a menu, a label, an edit field, a checkbox, a dialog box, and the like. The GUI may also provide the developer a means for creating a similar component specifically for the UI, based on the requirements of the UI. The UI composer 210 may further include a non graphical user interface for developing the UI. In some exemplary embodiments of the disclosed subject matter, the VI composer 210 enables the developer to utilize programming languages, such as C++, C#, Java™ £Oracle Inc., Delphi™ LBorlad Inc., Flash™/Adobe Inc., HTML, and the like, for developing the user interface. The UI creator 200 may also comprise a dummy service obtainer 230. The dummy service obtainer 230 obtains at least one dummy service according to at least one predetermined interface and/or logic.

The dummy service meets specifications of the predetermined interface. The predetermined interface may comprise one or more input fields to provide input data for a service. In some exemplary embodiments of the disclosed subject matter, the predetermined interface may also comprise one or more output fields to provide output data produced by the service depending on the one or more input fields. An exemplary predetermined interface may be an "AddClient" service. Another exemplary predetermined interface may be an "AddClient" service receiving, one input field, "ID", and outputting one output field "resultStatus".

The dummy service may or may not contain logical operations to be performed. In some exemplary embodiments of the disclosed subject matter, the dummy service implements a naïve implementation of the required logic. In other exemplary embodiments, the dummy service implements no logic at all. In yet other exemplary embodiments, the dummy service implements only a fragment of the required logic. In an exemplary embodiment of the disclosed subject matter, the dummy service provides an exemplary computation. For example, instead of having to compute a specific output for a specific input, the dummy service provides a predetermined output for a predetermined input. In some exemplary embodiments of the disclosed subject matter, the dummy service is a thin service, as opposed to a complex service, requiring little resources such as time and hardware.

The predetermined interface may be supplied to the dummy service obtainer 230 is by the developer, by a service developer or by another third party. The dummy service obtainer 230 may further obtain the predetermined interface from an interface database.

The dummy service obtainer 230 may further create the dummy service in accordance to the predetermined interface. In some exemplary embodiments of the disclosed subject matter, the dummy service obtainer 230 provides the developer a computerized wizard or a similar user interface allowing the developer to define input fields, output fields and logical operations to be performed by the dummy service. In some exemplary embodiments of the disclosed subject matter, aforementioned data or a portion of it may be supplied using a spreadsheet application such as Microsoft™ Excel™ and IBM™ Lotus 1-2-3™.

In other exemplary embodiments of the disclosed subject matter, the dummy service obtainer 230 may create a dummy service based on a template. The template may be created to answer different business requirements such as those set out by Java™ Oracle Inc. Database Connectivity, Business Warehouse, Business Application Programming Interface, and the like.

The dummy service may be part of a service layer, such as a service layer 160 of FIG. 1. The dummy service may be comprised in a UI layer, such as a UI layer 110 of FIG. 1, and it may not be accessible by some clients of a computerized network, such as a computerized network 150 of FIG. 1. In some exemplary embodiments of the disclosed subject matter, the dummy service is accessible only to a UI developer and QA personnel.

In some exemplary embodiments of the disclosed subject matter, the UI creator 200 further comprises a UI obtainer 235 for obtaining a UI based on the dummy service. In other exemplary embodiments of the disclosed subject matter in which a different type of software module is developed and not a UI, a software module obtainer (not shown) may be utilized in a similar manner to that of the UI obtainer 235. In some exemplary embodiments of the disclosed subject matter, the UI obtainer 235 obtains a UI based on a portion of the dummy services that are to be utilized by the UI. In some exemplary embodiments, the UI obtainer 235 may obtain an existing UI from a UI layer, such as UI layer 110. In other exemplary embodiments, the UI obtainer 235 may create the UI based on a portion of the dummy services that are to be utilized by the UI. For example, a dummy service may have an input field of "ID" and an output fields of "Employee Name" and "Children". Note that the "Children" field may be a field representing a list of names of the children of an employee, or a list of records for each child. The UI obtainer 235 may create a UI based on the dummy service by creating a form that includes one input field named "ID" and a "submit" button. The form may additionally comprise an "Employee Name" field for showing a name of an employee. The form may further comprise a "Children" field which may be a graphical representation of a list or a table, such as showing several records. The UI created by the UI obtainer 235 in the aforementioned example, may comprise a logic such that the text data entered using the "ID" field is sent to the dummy service as the input field "ID" after the "submit" button is pressed. The UI may further comprise a logic such that the text data returned by the dummy service in the "Employee Name" output field may be shown in the "Employee Name" field of the UI. The UI may further comprise a logic such that the text data returned by the dummy service in the "Children" output field may be shown in the "Children" field of the UI. Note that the UI obtainer 235 may obtain or create a UI such that not all the input or output fields are presented in a graphical manner. The UI obtainer 235 may obtain or create a UI such that not all the input or output fields are used by the UI. The aforementioned example is presented as an example only and should not be construed to limit the disclosed subject matter. Numerous types of fields may be used by services. UIs and other software modules. Graphical representation in a UI may differ according to representations known in the art.

In some exemplary embodiments of the disclosed subject matter, the UI creator 200 further comprises an adaptation module 220 for adapting a UI created by the UI composer 210 to use a dummy service obtained by the dummy service obtainer 230. In some exemplary embodiments of the disclosed subject matter, the adaptation module 220 may associate a service used by the UI with a service provided the dummy service. The adaptation module 220 may determine that only a portion of services used by the UI to be provided by the dummy service. The adaptation module 220 may further determine that several dummy services may provide different services used by the UI or a same service used by the UI in different scenarios, for example, a service for creating a user if being performed in two different scenarios may be provided by two different dummy services. The adaptation module 220 may adjust a service call performed by the UI to the predetermined interface implemented by the dummy service. The adaptation module 220 may create an intermediate service to adjust a predetermined service call performed by the UI to the dummy service. In other exemplary embodiments of the disclosed subject matter, the dummy service may be modified by the adaptation module 220 so that the predetermined service call will initiate the dummy service. In some exemplary embodiments of the disclosed subject matter, the adaptation module 220 provides a computerized wizard or a similar user interface to assist the developer in a adapting the UI to use the dummy service.

In some exemplary embodiments of the disclosed subject matter, the UI creator 200 further comprises a service replacement module 240 for replacing a dummy service with a second service. The second service may be an additional dummy service or an actual service to be initiated by the UI of a fully developed computer program. The service replacement module 240 may obtain the actual service from a service layer such as a service layer 160 of FIG. 1. The service replacement module 240 may obtain the additional dummy service from a service layer such as service layer 160 of FIG. 1, a UI layer such as a UI layer 110 of FIG. 1 or the dummy service obtainer 230. The actual service may meet the specifications of the predetermined interface. In some exemplary embodiments of the disclosed subject matter, the second service meets specifications of an interface substantially equivalent to the predetermined interface. A first interface is said to be substantially equivalent to a second interface if input fields of the first interface may be mapped to input fields of the second interface, such that a computation provided by a first service meeting specifications of the first interface is generally equivalent to a computation provided by a second service meeting specifications of the second interface. The service replacement module 240 may adjust a service call performed by the UI to the predetermined interface implemented so that the second service is initiated. The service replacement module 240 may create an intermediate service to adjust a predetermined service call performed by the UI to the second service. In other exemplary embodiments of the disclosed subject matter, the second service may be modified by the service replacement module 240 so that the predetermined service call will initiate the second service. In some exemplary embodiments of the disclosed subject matter, the service replacement module 240 may provide a computerized wizard or a similar user interface to allow the developer to replace the dummy service with the second service. The computerized wizard may allow the developer to map fields of the dummy service to field of the second service. The computerized wizard may suggest such mappings based on names of fields, data types of fields, a usage of the fields and the like. The computerized wizard may allow the developer to make selection using drag-and-drop user interface, as is known in the art. In some exemplary embodiments of the disclosed subject matter, aforementioned data or a portion of it may be supplied using a spreadsheet application such as Microsoft Excel and IBM Lotus 1-2-3.

In some exemplary embodiments of the disclosed subject matter, the service replacement module 240 maps an input field of the dummy service with one or more input fields of the second service. In other exemplary embodiments, mapping of several input fields of the dummy service is performed to one or more input fields of the second service. The service replacement module 240 may further map one or more output fields of the second service with one or more output fields of the dummy service. In some exemplary service replacement module 240, a logical operation is required to be performed in order to map one or more fields of a first service to one or more fields of a second service. For example, in case the first service has a field titled "Customer Name" which contains a name of customer and the second service has two fields titled "Customer First Name" and "Customer Last Name" a logical splitting operation is required. The field of the first service may be mapped to the two fields of the second service. Splitting of a text string represented by the "Customer Name" field may be required in order to fill the two fields of the second service.

Figure 3:
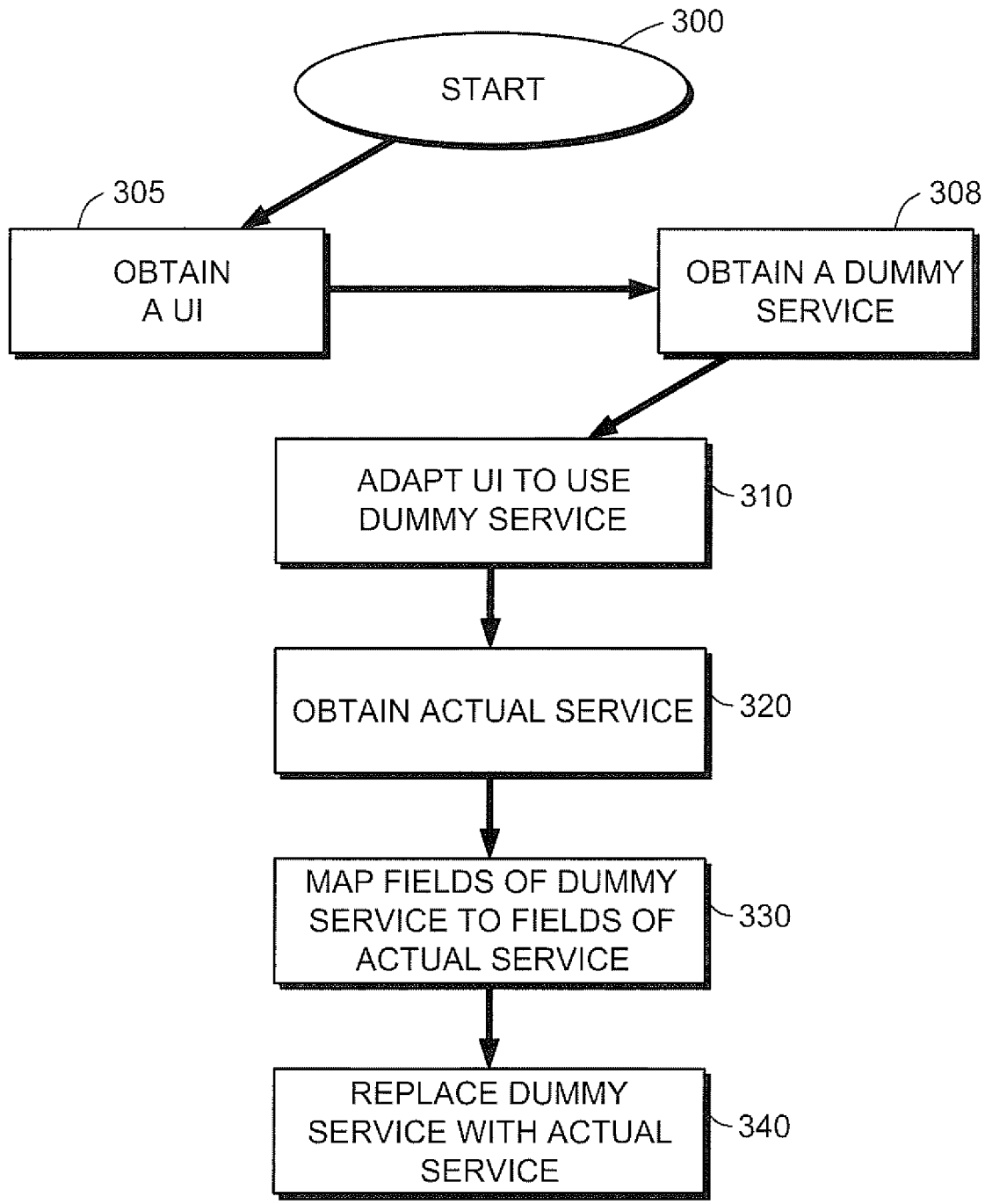
FIG. 3 shows a flow diagram of a method of developing a computer program, in accordance with some exemplary embodiments of the disclosed subject matter.

FIG. 3 shows a flow diagram of a method of developing a computer program, in accordance with some exemplary embodiments of the disclosed subject matter. In step 300 the development process begins. In step 305 a UI of a UI or other type of software module is obtained from a third party or created, as described above in relation to the UI obtainer 235 of FIG. 2 and to the UI composer 210 of FIG. 2. In step 308 a dummy service is obtained or created, as described above in relation to the dummy service obtainer 230 of FIG. 2. In step 310 the UI obtained at step 305 is adapted to use the dummy service obtained in step 308, as is disclosed above in relation to FIG. 2. After the UI is adapted to use the dummy service, a development version of a computer program being developed is obtained. A development version may also be a prototype of the computer program or a "proof of concept" of the computer program being developed. A developer may continue developing the UI of the computer program and QA personnel may inspect the UI of the computer program. Note that a person performing QA tasks is part of the development process and such a person is considered a developer. The disclosed description refers to QA personnel separately from other developers for exemplary purposes only, and should not be construed to limit the subject matter. In some exemplary embodiments of the disclosed subject matter, a prototype may be developed using the dummy service. In step 320 an actual service implementing the predetermined interface or a substantially equivalent interface is obtained. In some exemplary embodiments of the disclosed subject matter, the actual service may be obtained from a service layer such as a service layer 160 of FIG. 1. In some exemplary embodiments of the disclosed subject matter, a second dummy service is obtained instead of the actual service. For simplicity, below when referring to steps 330 and 340, reference is made to the actual service. However, it should be understood that the second dummy service may be used instead of the actual service, as is disclosed above. In step 330 a mapping process is performed. In some exemplary embodiments, the mapping process maps input fields of the dummy service to input fields of the actual service. In other exemplary embodiments of the disclosed subject matter, the mapping process maps output fields of the actual service to output fields of the dummy service. In some exemplary embodiments, the mapping process is performed with an intervention of a developer, by matching similar fields based on types, values, titles and the like. In other exemplary embodiments, the mapping process is performed by the developer. Some exemplary embodiments may combine aforementioned automatic and manual mapping. In some exemplary embodiments of the disclosed subject matter, a computerized wizard or similar user interface is used to assist the developer in mapping. In step 340, the dummy service is replaced by the actual service as is disclosed above in relation to FIG. 2.

Figure 4:
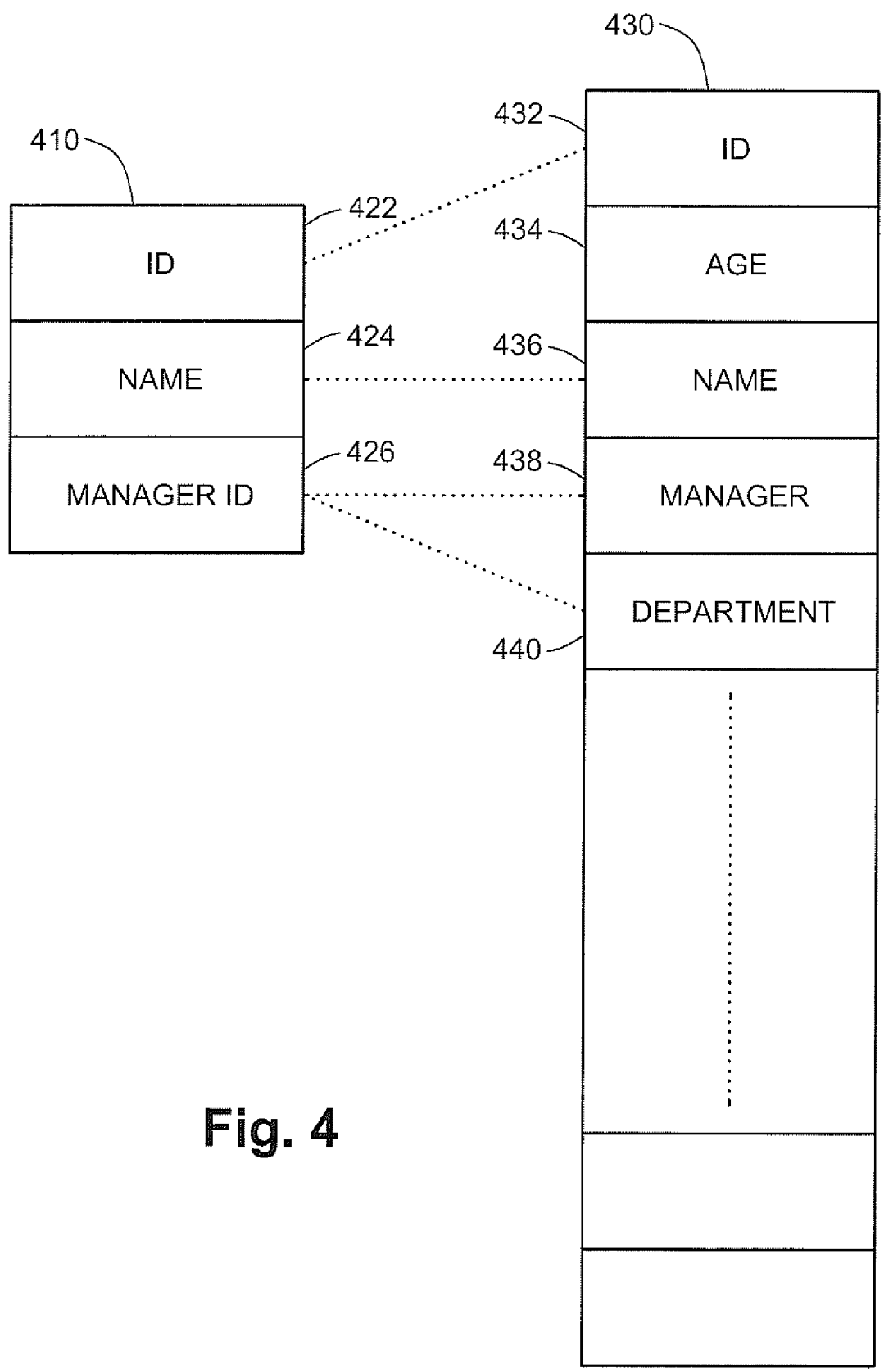
FIG. 4 shows exemplary fields of a dummy service and a real service both meeting a specification of a predetermined interface of "AddEmployee", in accordance with some exemplary embodiments of the disclosed subject matter.

FIG. 4 shows exemplary fields of a dummy service and a real service both meeting the specifications of a predetermined interface of "AddEmployee", in accordance with some exemplary embodiments of the disclosed subject matter. A first list of fields 410 represents fields of a dummy service. The first list of fields 410 contains three fields that the dummy service receives as either input or produces as output or a combination of the above. The three fields are an "ID" field 422, a "Name" field 424 and a "ManagerID" field 426. A second list of fields 430 contains one thousand fields. For example, an "ID" field 432, an "Age" field 434, a "Name" field 436, a "Manager" field 438 and a "Department" field 440. In an exemplary embodiment of the disclosed subject matter, all fields 422, 424, 426, 432, 434, 436, 438 and 440 are input fields. "ID" field 422 and "ID" field 432 contain the same information, thus an exemplary mapping of the first list of fields 410 to the second list of fields 430 may map "ID" field 422 with "ID" field 432. "Name" field 424 and "Name" field 436 contain the same information, thus an exemplary mapping of the first list of fields 410 to the second list of fields 430 may map "Name" field 432 with "Name" field 436. "ManagerID" field 426 contains an identification of a manager of an employee. In the second list of fields 420 the "Manager" field 438 contains, for example, a name of a manager of an employee. A "Department" field 440 contains, for example, an identification of the department in which the employee is employed. A content of both the "Manager" field 438 and the "Department" field 440 may be derived according to the content of the "ManagerID" field 426, as a name of the manager may be retrieved using his identification number, and a department of the manager is also a department of the employee.

Figure 5:
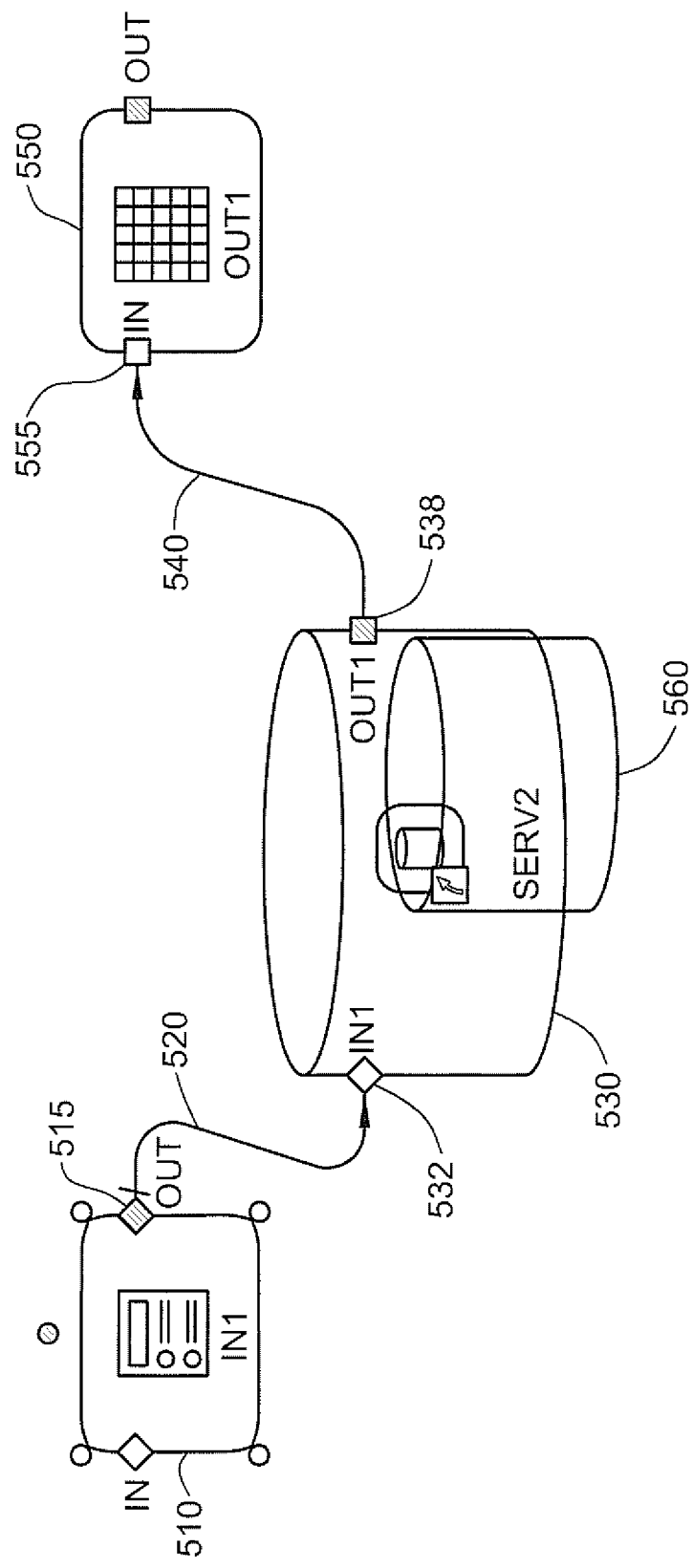
FIG. 5 shows an exemplary graphical user interface of an embodiment of the disclosed subject matter, in accordance with some exemplary embodiments of the disclosed subject matter.

FIG. 5 shows an exemplary graphical user interface of an embodiment of the disclosed subject matter, in accordance with some exemplary embodiments of the disclosed subject matter. An output software module 510 has a first output field 515. An input software module 550 has a first input field 555. In some exemplary embodiments of the disclosed subject matter the input software module 550 and the output software module 510 represent the same software module. In other exemplary embodiments, the input software module 550 is different than the output software module 510. In other exemplary embodiments, one of the input software module 550 and the output software module 510 may be absent. In other exemplary embodiments one software module such as 510 contains both input fields and output fields and is used as both the input software module 550 and the output software module 510. A dummy service 530 has a second input field 532 and a second output field 538. A first arrow 520 represents that the first output field 515 is connected to the second input field 532. A second arrow 540 represents that the second output field 538 is connected to the first input field 555. In some exemplary embodiments of the disclosed subject matter, in case all output field is connected to an input field, a data in the output field is passed to the connected input field. In some exemplary embodiments of the disclosed subject matter, the data is passed after an occurrence of a predetermined event, such as pressing a submit button, passage of predetermined time and the like. A second service 560 that may be a second dummy service or an actual service is selected to replace the dummy service 530. In an exemplary embodiment of the disclosed subject matter, the second service 560 is "drag-and-dropped" over the dummy service 530. Using a pointing device the second service 560 is selected. The pointing device is further used to move the second service 560 over the dummy service 530. Once the second service 560 is positioned in the desired location, the pointing device is used to indicate the end of the "drag-and-drop" operation. In other exemplary embodiments of the disclosed subject matter, a "copy-paste" or "cut-paste" operation is performed using either a pointing device or a key input device such as a keyboard, to indicate which element, such as the second service 560, is selected, copied or being cut, and to which location or instead of which service, it is being pasted. In other exemplary embodiments, a selection from a predetermined set of services may be performed in order to replace the dummy service 530.

Figure 6:
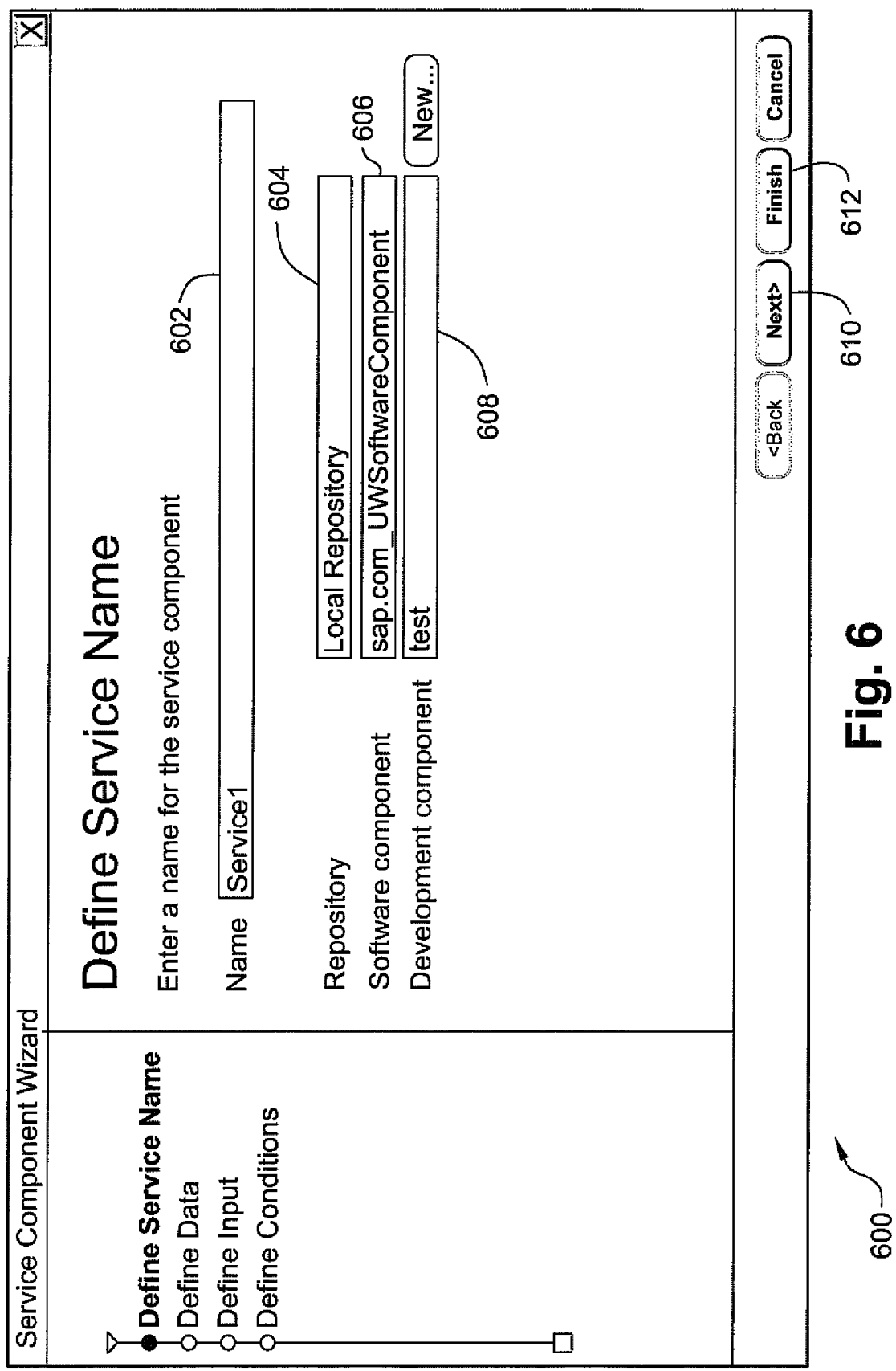
FIG. 6 shows an exemplary first form of a computerized wizard for creating a dummy service, in accordance with some exemplary embodiments of the disclosed subject matter.

FIG. 6 shows an exemplary first form of a computerized wizard for creating a dummy service generally referenced 600, in accordance with some exemplary embodiments of the disclosed subject matter. The first form 600 comprises several fields for defining, attributes of the dummy service, such as a name 602, a repository in which to be created 604, a software component in which the dummy service is contained 606, a development component in which the dummy service is contained 608. Once a developer defined the attributes, a "Next" button 610 may be pressed to proceed to a second form. In some exemplary embodiments of the disclosed subject matter a "Finish" button 612 may be pressed to initiate a creation of the dummy service based on the defined attributes and other default parameters.

Figure 7:
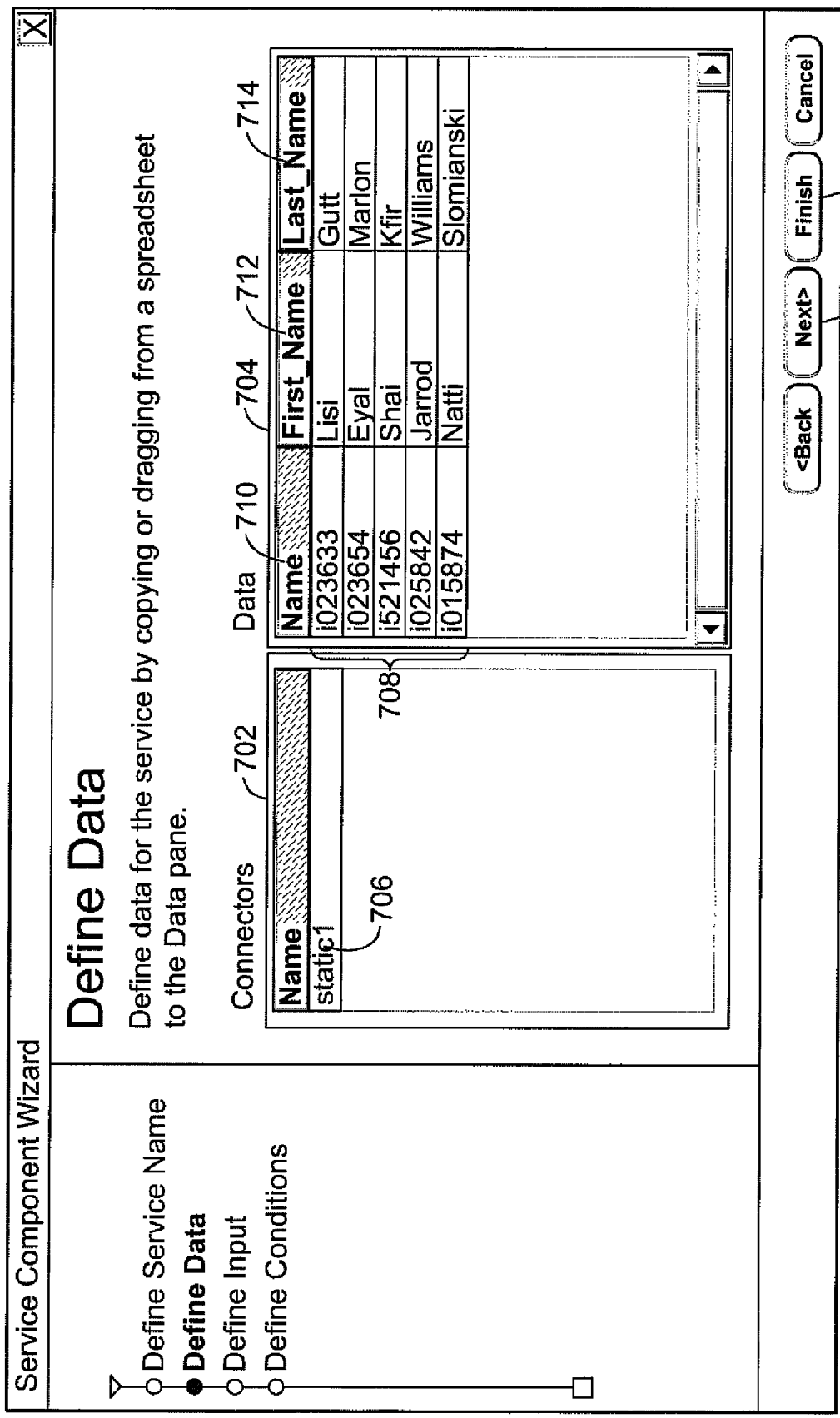
FIG. 7 shows an exemplary second form of a computerized wizard for creating a dummy service, in accordance with some exemplary embodiments of the disclosed subject matter.

FIG. 7 shows an exemplary second form of a computerized wizard for creating a dummy service generally referenced 700, in accordance with some exemplary embodiments of the disclosed subject matter. The second form 700 is used to define data of the dummy service. The second form 700 comprises a connectors panel 702 and a data panel 704. The connectors panel 702 comprises one or more connectors to data comprised in the dummy service. In the present example, a "static1" connector 706 is an only connector for a dummy service. The data panel 704 comprises of one or more records comprised in a connector of the dummy service. In the present example, the "static1" connector 706 comprises 5 records of data, each comprises three data members: "ID" 710. "First_Name" 712 and "Last_Name" 714. The records may be inputted using a spreadsheet application or by entering data directly to the data panel 704. Once a developer defined the data, a "Next" button 716 may be pressed to proceed to a third form. In some exemplary embodiments of the disclosed subject matter, a "Finish" button 718 may be pressed to initiate a creation of the dummy service based on the defined attributes, data and other default parameters.

Figure 8:
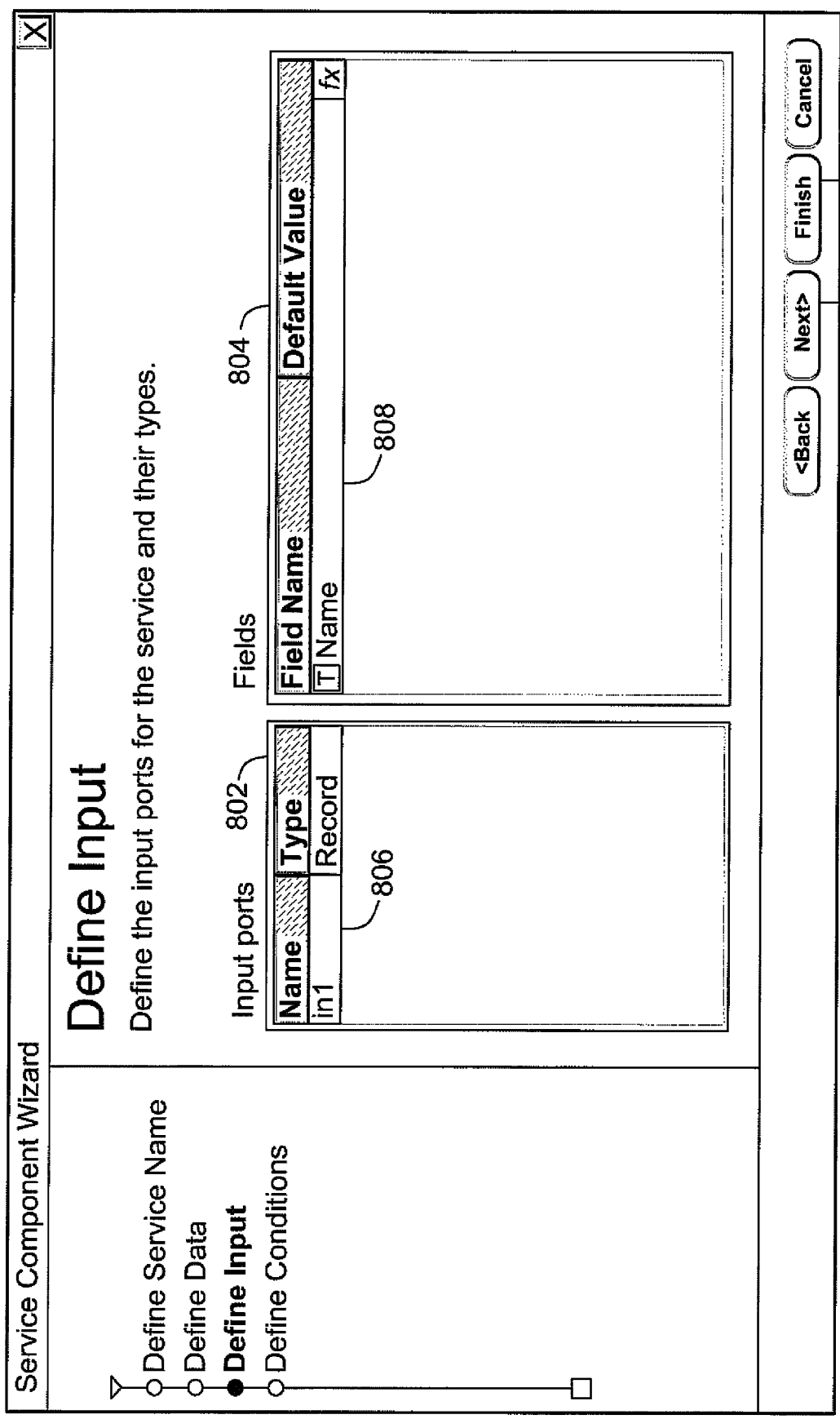
FIG. 8 shows an exemplary third form of a computerized wizard for creating a dummy service, in accordance with some exemplary embodiments of the disclosed subject matter.

FIG. 8 shows an exemplary third form of a computerized wizard for creating a dummy service generally reference 800, in accordance with some exemplary embodiments of the disclosed subject matter. The third form 800 is used to define input of the dummy service. The third form 800 comprises an input ports panel 802 and a fields panel 804. The input ports panel 802 comprises of input ports to receive input to the dummy service. Input ports may be of different types, such as a record, a record set, and the like. In the present example, an input port "in1" 806 is of type record. The fields panel 804 is utilized to define an input port. In the present example, the input port "in1" 806 is a record which has a "Name" field 808. The fields may be of different types, such as text, Boolean, integer, double precision number, and the like. A default value may be set for a field using a default value field 810. The fields and or input ports may be inputted using a spreadsheet application or by entering data directly to the input ports panel and to the fields panel. Once a developer defined the input, a "Next" button 812 may be pressed to proceed to a fourth form. In some exemplary embodiments of the disclosed subject matter, a "Finish" button 814 may be pressed to initiate a creation of the dummy service based on the defined attributes, data, input and other default parameters.

Figure 9:
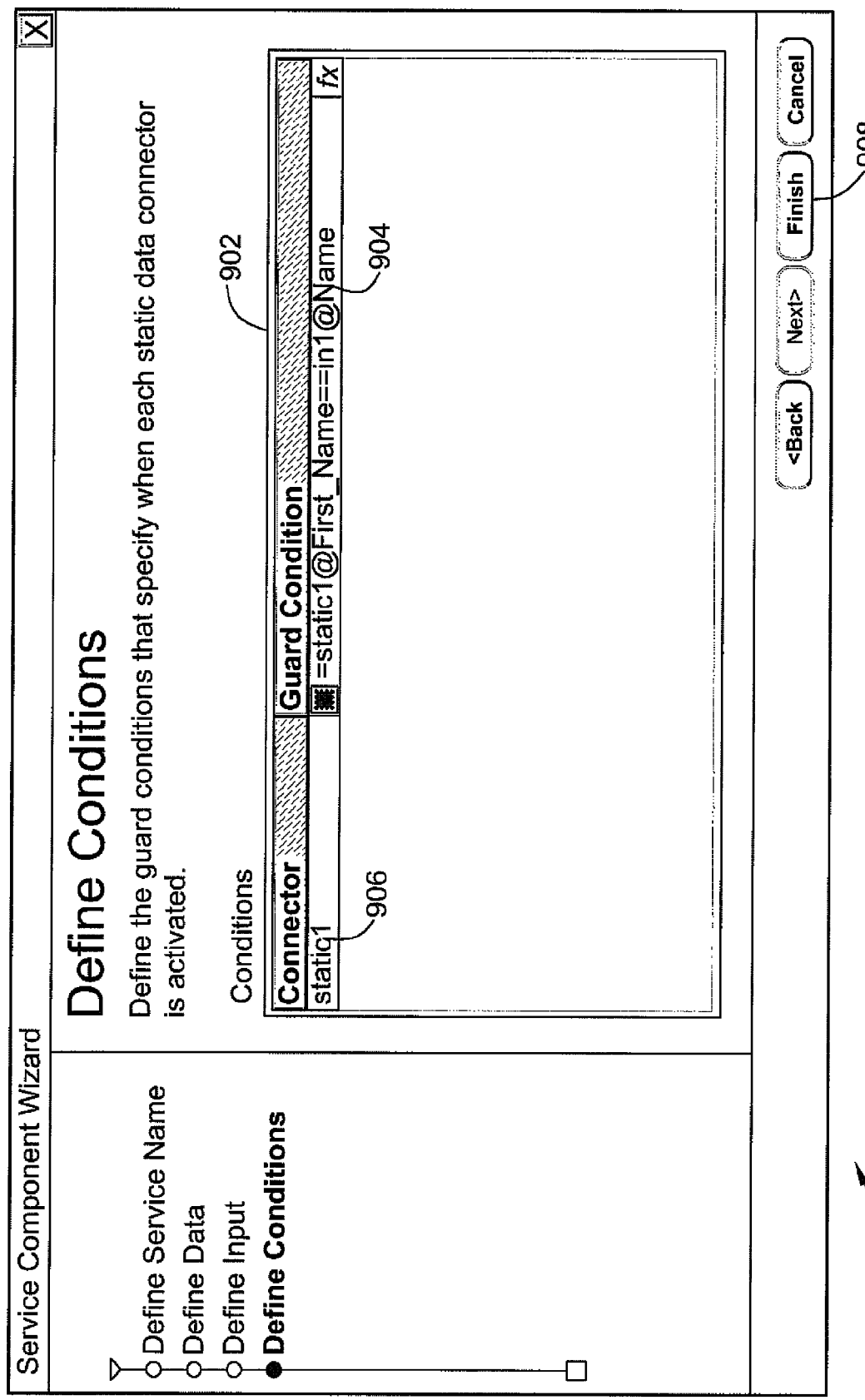
FIG. 9 shows an exemplary fourth form of a computerized wizard for creating a dummy service, in accordance with some exemplary embodiments of the disclosed subject matter.

FIG. 9 shows an exemplary fourth form of a computerized wizard for creating a dummy service generally referenced 900, in accordance with some exemplary embodiments of the disclosed subject matter. The fourth form 900 is used to define logical conditions of the dummy service. The fourth form 900 comprises a conditions panel 902, comprising all connectors of the dummy service, as defined using the second form, such as 700 of FIG. 7. For each connector, a guard condition is defined to determine which record of the connector is to be outputted by the dummy service based on given input. For example, a "true" condition may be used to determine that each record is returned by the dummy service. In the present example, a guard condition stating 904 "=static1@First_Name==in1@Name" is defined for the "static1" connector 906, indicating that a record of the "static1" connector 906 is outputted by the dummy service only if the data in its "First_Name" field is equal to the data received by the dummy service via the "in1" input port in the "Name" field. Such a guard condition may be used to create a dummy service for an employee search service, in which a first name of an employee is provided and the service searches for all employees having a same first name. A "Finish" button 908 may be pressed to initiate a creation of the dummy service based on the defined attributes, data, input, guard conditions and other default parameters.

A person skilled in the art will appreciate that there exist multiple embodiments and variations exist which follow the guidelines of the disclosed methods and apparatus. Multiple implementations may exist for determining connections between categories or key-phrases, based on multiple factors, and expressed as a multiplicity of formulae. There may also exist numerous representation options which demonstrate the connections and the connections' intensity.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for enabling development of a computer program within a computerized environment, the computer program comprising at least a software module that is designed to use at least one service, the method employing a processor and at least one I/O port, and comprising:
   obtaining at least one dummy service, wherein the at least one dummy service comprises a code executable by a processing device;
   obtaining the software module;
   adapting the software module to use at least one dummy service;
   providing an adaptation module that associates a portion of the at least one service used by the software module with at least one service provided by at least one dummy service,
   thereby providing a development version of the computer program, wherein the development version of the computer program comprises the at least one software module that utilizes the at least one service provided by the at least one dummy service; and
   providing a replacement module for replacing the at least one dummy service with at least one second service,
   whereby utilizing the replacement module modifies the software module such that the at least one second service provides at least one service for the software module upon service request from the software module.

2. The method of claim 1, wherein the replacement module is able to assist the developer in mapping at least one input field of the at least one dummy service with at least one input field of the at least one second service.

3. The method of claim 1, wherein said step of enabling a developer to obtain at least one dummy service comprises a step of providing a dummy service obtainer for obtaining the at least one dummy service.

4. The method of claim 3 wherein the dummy service obtainer creates the at least one dummy service.

5. The method of claim 1, wherein the software module is a user interface.

6. A method for developing a computer program within a computerized environment, the program comprising at least a software module that is designed to use at least one service, the method employing a processor and at least one I/O port, and comprising:
   obtaining the software module for developing of the computer program;
   obtaining an at least one dummy service, wherein the at least one dummy service comprises a code executable by a processing device;
   associating a portion of the at least one service used by the software module with at least one service provided by the at least one dummy service;
   wherein said step of associating the software module is performed by an adaptation module that provides a development version of the computer program, wherein the development version of the computer program comprises the at least one software module that utilizes the at least one service provided by the at least one dummy service; and
   replacing the at least one dummy service by at least one second service;
   wherein said step of replacing the at least one dummy service is performed by a service replacement module;
   and whereby the at least one second service provides at least one service for the software module upon service request from the software module.

7. The method of claim 6, wherein said step of replacing the at least one service is performed by mapping at least one input field of the at least one dummy service with at least one input field of the at least one second service.

8. The method of claim 6 further comprising a step of obtaining the at least one second service from a predetermined set of services.

9. The method of claim 6, wherein said step of obtaining an at least one dummy service comprises creating the at least one dummy service based on an interface.

10. The method of claim 9, wherein said step of creating the at least one dummy service utilizes a template.

11. The method of claim 9, wherein said step of creating the at least one dummy service further comprises defining at least one input field; defining at least one output field; and defining logic to be performed on the at least one input field to determine a value for each of the at least one output field.

12. The method of claim 6 further comprising a step of creating the software module based on a portion the at least one dummy service.

13. The method of claim 6, wherein the software module is a user interface.

* * * * *